United States Patent [19]

Müller et al.

[11] 3,908,829

[45] Sept. 30, 1975

[54] SELECTOR APPARATUS FOR RECORD SHEETS

[75] Inventors: Frank Müller; Lothar Hoffmann, both of Dresden, Germany

[73] Assignee: VEB Pentacon Dresden, Dresden, Germany

[22] Filed: Apr. 12, 1974

[21] Appl. No.: 460,275

[30] Foreign Application Priority Data

June 13, 1973 Germany .............................. 171494

[52] U.S. Cl. .............................. 209/80.5; 209/110.5

[51] Int. Cl.$^2$ .............................. B07C 5/12

[58] Field of Search .............................. 209/80.5, 110.5

[56] References Cited

UNITED STATES PATENTS

| | | | |
|---|---|---|---|
| 1,876,149 | 9/1932 | Oakley | 209/110.5 |
| 3,347,241 | 10/1967 | Hiller et al. | 209/110.5 |
| 3,732,977 | 5/1973 | Deprey | 209/110.5 |

*Primary Examiner*—Allen N. Knowles
*Attorney, Agent, or Firm*—William Anthony Drucker

[57] ABSTRACT

For removing a desired record sheet from a stack of such sheets, each sheet having slots, notches or holes therein, an apparatus is provided comprising a housing, a support for the stack within the housing, vertical selector pins for engagement in said slots, notches or holes and means for moving the selector pins thereby to engage and remove a desired record sheet from the stack.

12 Claims, 4 Drawing Figures

SELECTOR APPARATUS FOR RECORD SHEETS

BACKGROUND TO THE INVENTION

The invention relates to a selector apparatus for information carriers in sheet form, i.e., record sheets.

Such selector apparatuses are known in which horizontally arranged selector pins engage in notches, holes or slots of record sheets and in accordance with the code combination the record sheets which are not sought hang on the selector pins and are held fast there, while those to be withdrawn drop out downwards. Such devices render it possible to obtain rapid access to sought record sheets which are stored in random order.

In modern record carrier processing appliances, as for example viewing, enlarging and duplicating appliances, especially in connection with large storage installations, the horizontal form of the record sheet arrangement makes itself mostly necessary. Since with the known selector appliances based upon selector pins and notch holes, the vertically arranged record sheet also fall down in this form, special guideway configurations become necessary for orientation, necessitating a substantially increased space requirement of the appliance.

The invention has the purpose of adapting the selector appliances based upon selector pins and notch holes better to modern storage and processing appliances.

The invention is based upon the problem of producing such a selector appliance in which the record sheet to be selected come to be issued directly in the horizontal arrangement necessary for further processing.

SUMMARY OF THE INVENTION

According to the invention there is provided an apparatus for removing a desired record sheet from a stack of such sheets laid horizontally one upon another, each of said sheets having thereon identification means selected from the group consisting of slots, notches and holes, said apparatus comprising a housing, and means within said housing for supporting said stack, the provision of:

a. a plurality of vertical selector pins positioned within the housing for engagement in said identification means; and b. means for moving one or more of said selector pins according to the record sheet desired, to remove said desired record sheet from said stack.

According to further features of the invention the selector pins are arranged in several groups for selection by stages. The stack of record sheets to be selected is accommodated in cassettes which possess openings of slot form for the selector pins and a removable side each in the form of a slider on one end.

In an advantageous development of the invention the selector pins are guided horizontally on sprung push and drive rods by means of cam discs, each push rod being detachably connected with a drive rod by means of a detent pawl. The detent pawl is pivotably mounted on the drive rod and provided with a spring. For the deflection of the detent pawl a pin is provided which is connected with a spring and a pulling electro-magnet.

In a further development of the invention the drive rods possess sleeves in which the selector pins are vertically movably mounted. The selector pins each have a recess for the reception of an end of an angled-off lever pivotable about a pivot point fast with the housing. Each of these levers is connected with a pulling electro-magnet and a housing-fast spring, while again each pulling electro-magnet is connected with a switch, preferably a micro-switch, which is operable by the drive rod.

Another embodiment according to the invention is based on the fact that upon at least one movable base of the nature of a trolley or carriage, selector pins for another stage of selection are arranged in sleeves for movement vertically by means of angled-off levers pivotably arranged on this base. These levers are also connected with springs and pulling magnets fast with the base.

In a special development of the invention in the region of the initial position of the selector pins there is a lift which is provided to receive the cassette and is lowerable on to the selector pins, while in the region of the upper position of the lift there are arranged pins which engage in recesses on the lid of the cassette.

The advantages deriving from the invention consist in that due to the fact that the record sheets arrive directly horizontally, while the favourable notch hole-pin selection is retained, no special expensive guide elements such for example as aligning devices etc. become necessary. This renders possible good space exploitation in combination with processing appliances and provides favourable prerequisites for use in connection with a large storage installation. Furthermore this selection principle proves advantageous in adaptation to mechanised or automated actuating systems.

BRIEF DESCRIPTION OF THE DRAWINGS

The invention is illustrated and described hereinafter with reference to an example for an automatic reading appliance. In the drawing.

DESCRIPTION OF PREFERRED EMBODIMENTS

Figure 1:
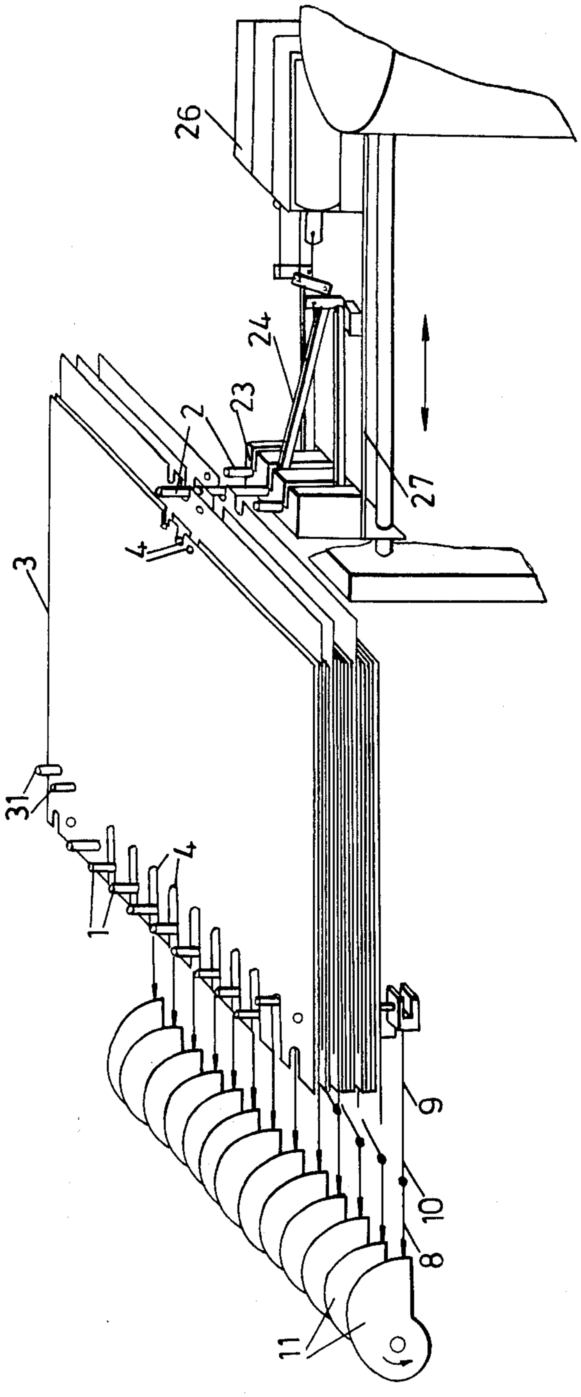
FIG. 1 shows a perspective representation of the selection apparatus.
Figure 2:
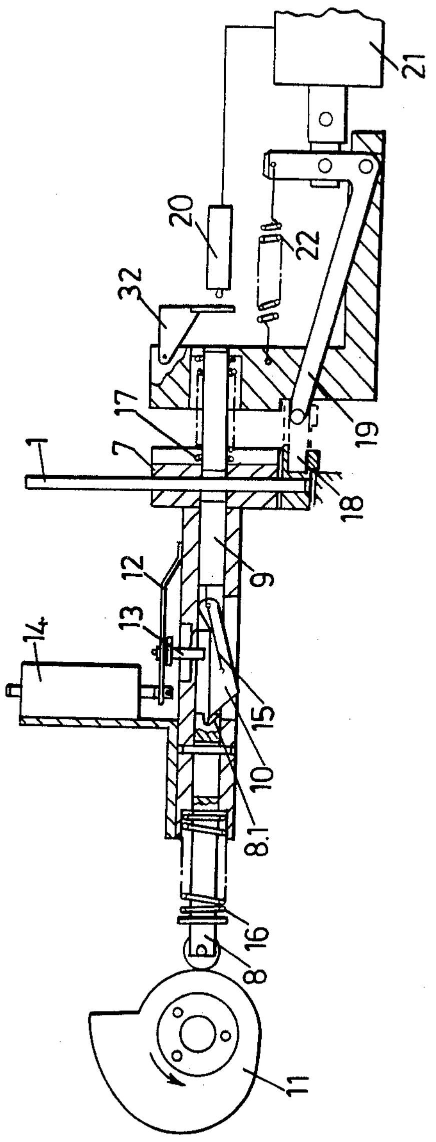
FIG. 2 shows the representation of a selector pin setting mechanism.
Figure 3:
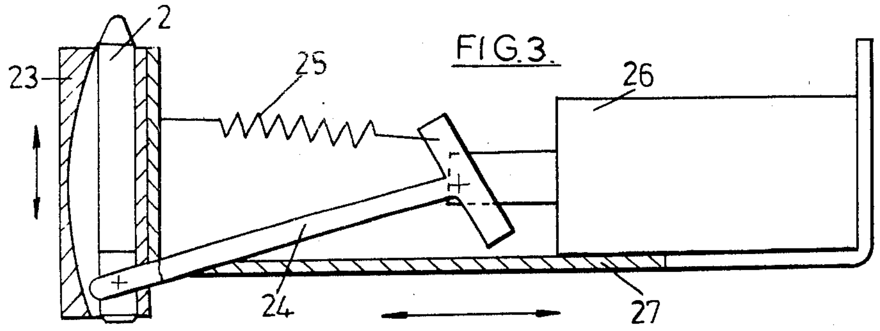
FIG. 3 shows the representation of a further selector pin setting mechanism.
Figure 4:
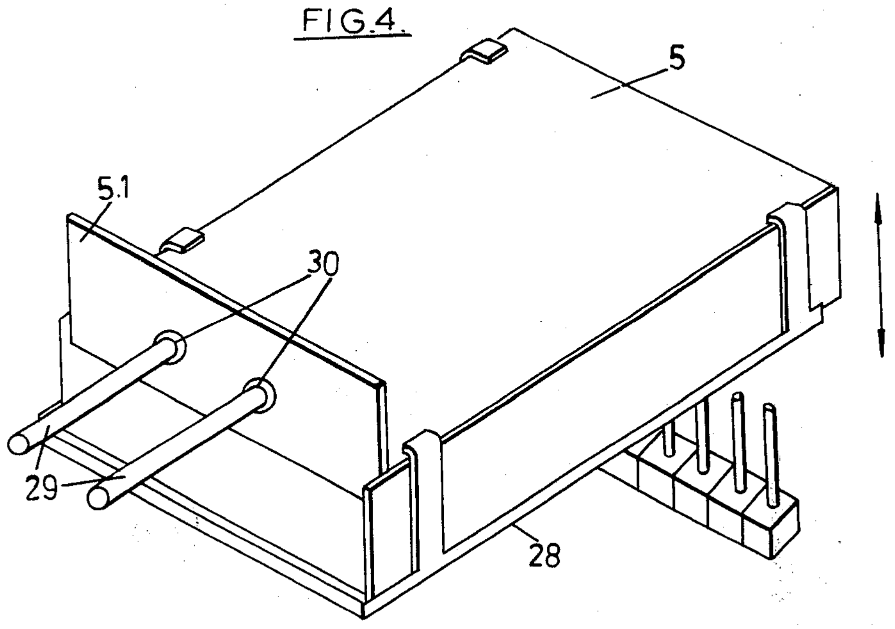
FIG. 4 shows a representation of the cassette input.

Record sheets 3 provided with code recesses 4 in the form of notches or holes are accommodated in stack form here in cassettes 5.

Each cassette 5 has a withdrawable side 5.1 at one end, which is provided with recesses 30 for the reception of housing-fast pins 29. On the base the cassettes 5 have openings 6 (not shown) corresponding to the position of several code recesses 4. For cassette feed a vertically movable lift 28 in the form of a frame is provided which is situated above the selector pins 1. Moreover selector pins 2 and retaining pins 31 for the selection process are also present.

The selector pins 1 are vertically movably mounted in sleeves 7 which are provided with horizontally movable drive rods 9. These are connected through detent pawls 10 with push rods 8, which detent pawls 10 are pivotably mounted on the drive rods 9 and connected therewith springs 15 and engage in receiving detents 8.1 on the push rods 8. Drive rods 9 and push rods 8 are provided with springs 16 and 17 and mounted in sleeve manner. A pin 13 can be pressed on to each detent pawl 10 and is then under the influence of a housing-fast spring 12 with which it is firmly connected. This spring 12, which is formed as a leaf spring, is again connected with a pulling electro-magnet 14. Cam discs 11 are provided to move the push rods 8.

In the end position of the shifting movements of the drive rods 9 there are micro-switches 20 which are operable by means of the pivot stop 32. Each micro-switch 20 is again connected with a pulling electro-magnet 21 serving to operate a lever 19. The lever 19 is angled-off and pivotable about a pivot point, is connected with a housing-fast spring 22, and its free end is insertable, on displacement of the respective selector pin 1, into a recess 18 on the lower end of the selector pin 1.

The selector pins 2 for the second selection stage are arranged on a support 27 of the nature of a trolley or carriage in sleeves 23. These sleeves 23 are slotted for movement freedom for levers 24 for the actuation of the selector pins 2. The levers 24 are angled-off and mounted pivotably about a pivot point on the support 27. Moreover each lever 24 is connected with a spring 25 fast with the base and with a pulling electro-magnet 26. As not further illustrated, the record sheets after selection are fed by means of known mechanisms to the working process, that is for example positioned in the ray path of the projection apparatus. For return transport a mechanical guide device likewise of known type, for example in the form of a hinged plate, is provided so that the finished record carriers always arrive at the top into the cassette.

The apparatus works as follows:

The record sheets 3 to be brought to projection are pushed in the cassette 5 in horizontal form into the lift 28. The pins 29 here engage in the recesses 30 on the side 5.1 of the cassette 5 and hold this lid fast, so that on lowering of the cassette 5 by means of the lift 28 on to the selector pins 1 the side is opened. The selector pins 1 engage in the lowering of the cassette 5 through the openings into the code recesses 4 of the record sheets 3 and firstly hold these fast. Now the desired record carrier number is set. The selection follows in two stages. It commences with the rotation of the cam disc 11 to the highest extreme position, so that all push rods 8 are displaced against the action of the spring 16. The corresponding pulling electro-magnet 14 is pulled up previously by the number setting of the desired record sheet 3, so that the detent pawl 10 hitherto depressed by the pin 13 with the spring 12 comes due to the action of the spring 15, which is naturally weaker than the spring 12, into the pushing region of the push rod 8 and is then received by the latter in the receiving groove 8.1. Furthermore the pulling electro-magnet 21 is pulled up, which lifts the lever 19 against the action of the spring 22.

With the connection of the push rod 8 and drive rod 9 through the detent pawl 10, the corresponding selector pin 1 with its sleeve 7 is moved horizontally, whereby according to the code system is pushes all record sheets 3 having the same units number (for example the third, the thirteenth and the twenty-third) a short distance out of the cassette 5. In this end position of the displacement of the selector pin 1 and the free end of the lever 19 comes to engage in the recess 18. At the same time the end of the drive rod 9 strikes upon the pivot stop 32 and thus actuates the micro-switch 20, by which the pulling electro-magnet 21 is switched off, so that the lever 19 is pulled downwards by the spring 22 and thus draws the selector pin 1 out of the record sheet 3. In connection with this retaining pins 31 acting as negation pins travel upwards and from the record sheet 3 drawn forward they hold all other unrequired record sheet 3 fast according to the tens position. The sought record sheet 3 is then engaged by the selector pin 2 in the second stage of selection, in that the pulling electro-magnet 26 moves the lever 24 against the action of the spring 25 and lifts the selector pin 2. Here a negation principle becomes clear, since contrarily to the retaining pins 31, which firmly grasp the unrequired record sheet 3, now only the sought record sheet 3 is grasped with the selector pin 2. By means of the support 27 then this record sheet 3 is supplied for exact positioning in the ray path. After processing has taken place it arrives for return transport by way of the mechanical guide device at the top into the cassette 5. Thus a fully automatic course of working is guaranteed for the feed of record sheet cassettes into a reading appliance.

We claim:

1. In an apparatus for removing a desired record sheet from a stack of such sheets laid horizontally one upon another, each of said sheets having thereon identification means selected from the group consisting of slots, notches and holes, said apparatus comprising a housing and means within said housing for supporting said stack, the provision of:

a. a plurality of vertical selection pins positioned within the housing and movable vertically for engagement in said identification means; and b. means for moving one or more of said selector pins horizontally according to the record sheet desired, to remove said desired record sheet from said stack, wherein the selector pins are arranged in several groups for the removal of said desired record sheet by stages.

2. Apparatus according to claim 1 wherein each selector pin is guided horizontally on a spring loaded push and drive rod acted upon by a cam disc.

3. Apparatus according to claim 2, wherein the push rod is detachably connected with the drive rod by means of a spring loaded pawl, the detent pawl being mounted pivotably on the drive rod.

4. Apparatus according to claim 3, wherein for the deflection of the detent pawl a spring loaded pin is provided acted upon by a pulling electro-magnet.

5. Apparatus according to claim 2, wherein the drive rod possess a sleeve in which the selector pin is vertically movably mounted.

6. Apparatus according to claim 5, wherein each selector pin has a recess for the reception of one end of an angled-off lever pivotable about a pivot point secured to the housing.

7. Apparatus according to claim 6, wherein the lever is connected with and acted upon by a pulling electro-magnet and is spring loaded by a spring attached at one end to the lever and at the other end to the housing.

8. Apparatus according to claim 7, wherein the pulling electro-magnet is connected with a micro-switch, which is operable by the drive rod.

9. Apparatus according to claim 1 wherein at least one group of said selector pins is mounted on a horizontally movable support and each selector pin of said group is arranged in a sleeve for movement vertically by means of an angled-off lever arranged pivotably on this support.

10. Apparatus according to claim 9, wherein the lever is connected with a pulling electro-magnet and is spring loaded by means of a spring secured at one end to the lever and at the other end to the support.

11. Apparatus according to claim 1, wherein the stack is accommodated in a cassette which comprises a base, openings in said base of slot form for the selector pins and a removable side, and in the region of the initial position of the selector pins there is a lift which is provided to receive the cassette and which is lowerable on to the selector pins.

12. Apparatus according to claim 11, wherein in the region of the upper position of the lift there are arranged pins which are capable of engaging in recesses on the removable side of the cassette to remove said side from the cassette upon the lowering of the cassette on to the selector pins.

* * * * *